US012179517B2

(12) United States Patent
Geng et al.

(10) Patent No.: US 12,179,517 B2
(45) Date of Patent: Dec. 31, 2024

(54) HIGH GRIP SNOW TIRE

(71) Applicant: HEBEI WANDA TYRE CO., LTD., Hebei (CN)

(72) Inventors: Peng Geng, Tianjin (CN); Mingzheng Lin, Tianjin (CN)

(73) Assignee: HEBEI WANDA TYRE CO., LTD., Hebei (CN)

( * ) Notice: Subject to any disclaimer, the term of this patent is extended or adjusted under 35 U.S.C. 154(b) by 429 days.

(21) Appl. No.: 17/543,739

(22) Filed: Dec. 7, 2021

(65) Prior Publication Data

US 2022/0088969 A1 Mar. 24, 2022

Related U.S. Application Data

(63) Continuation of application No. PCT/CN2020/102464, filed on Jul. 16, 2020.

(30) Foreign Application Priority Data

Jun. 11, 2020 (CN) .......................... 202021073893.X

(51) Int. Cl.
*B60C 11/03* (2006.01)
*B60C 9/02* (2006.01)
(Continued)

(52) U.S. Cl.
CPC ................ *B60C 11/16* (2013.01); *B60C 9/02* (2013.01); *B60C 11/0302* (2013.01);
(Continued)

(58) Field of Classification Search
CPC ... B60C 11/032; B60C 11/1376; B60C 11/11; B60C 11/0302; B60C 11/16
See application file for complete search history.

(56) References Cited

U.S. PATENT DOCUMENTS

2008/0110542 A1* 5/2008 Sueishi ................... B60C 11/13
152/209.25
2015/0158339 A1* 6/2015 Marui ................. B60C 11/0327
152/209.1
(Continued)

FOREIGN PATENT DOCUMENTS

CA      2176519 A1 * 12/1997 ............. B60C 11/03
CN    201677701      12/2010
(Continued)

OTHER PUBLICATIONS

Colorado Cyclist, 1994, p. 33, tires 19 and 20.*
(Continued)

*Primary Examiner* — Justin R Fischer
(74) *Attorney, Agent, or Firm* — Cooper Legal Group, LLC

(57) ABSTRACT

The present application relates to a high grip snow tire, which belongs to a field of snow tire, including a carcass. The carcass is provided with pattern blocks and friction blocks on the circumferential surface thereof, which are positioned on the same side with the equatorial plane of the carcass. The pattern blocks and the friction blocks are successively distributed along the circumference of the carcass, and are in mirror symmetry about the equatorial plane. The friction block includes a plurality of fixing protrusions, which are gradually sharp along the direction away from the carcass. The carcass is provided with a protection groove on the surface thereof, and the fixing protrusions are positioned in the protection groove. The present application has the effect of improving the grip.

7 Claims, 5 Drawing Sheets

(51) Int. Cl.
*B60C 11/11* (2006.01)
*B60C 11/13* (2006.01)
*B60C 11/16* (2006.01)

(52) U.S. Cl.
CPC ............ *B60C 11/032* (2013.01); *B60C 11/11* (2013.01); *B60C 11/13* (2013.01); *B60C 11/1376* (2013.01)

(56) References Cited

U.S. PATENT DOCUMENTS

| | | | |
|---|---|---|---|
| 2018/0264888 A1* | 9/2018 | Hinami | B60C 11/0302 |
| 2019/0126689 A1* | 5/2019 | Marui | B60C 11/1376 |
| 2019/0299719 A1* | 10/2019 | Murata | B60C 13/02 |

FOREIGN PATENT DOCUMENTS

| | | | | |
|---|---|---|---|---|
| CN | 203418935 | | 2/2014 | |
| CN | 207224987 | | 4/2018 | |
| CN | 109649090 A | * | 4/2019 | ............ B60C 11/03 |
| GB | 443862 A | * | 3/1936 | ......... B60C 11/0306 |
| JP | 2010070055 A | * | 4/2010 | ............ B60C 11/16 |
| JP | 3195409 U | * | 1/2015 | ............... B60C 3/02 |

OTHER PUBLICATIONS

"International Search Report (Form PCT/ISA/210) of PCT/CN2020/102464" mailed on Mar. 12, 2021, pp. 1-5.

"Written Opinion of the International Searching Authority (Form PCT/ISA/237) of PCT/CN2020/102464" mailed on Mar. 12, 2021, pp. 1-4.

* cited by examiner

HIGH GRIP SNOW TIRE

CROSS-REFERENCE TO RELATED APPLICATION

This application a continuation of international application of PCT application No. PCT/CN2020/102464 filed on Jul. 16, 2020, which claims the priority to Chinese patent application serial No. 202021073893.X, filed on Jun. 11, 2020. The entirety of the above-mentioned patent application is hereby incorporated by reference herein and made a part of this specification.

TECHNICAL FIELD

The present application relates to the technical field of snow tire, and in particular, to a high grip snow tire.

BACKGROUND ART

At present, when the tire is running on the road with ice and snow, a layer of water film may be formed on the contact surface, so as to reduce the grip between the tire and the road surface, which may lead to tire slip, and further affect the safety of vehicle running. Therefore, directing to the places, where are prone to snow, snow tires are needed to be used to increase the grip.

SUMMARY

In order to increase the grip effect of the snow tire, the present application provides a high grip snow tire.

The high grip snow grip in the present application adopts the following technical solution: a high grip snow tire includes a tread, pattern blocks and friction blocks are provided on a circumferential surface of the tread, and positioned on the same side with an equatorial plane of the tread. The pattern blocks and the friction blocks are successively distributed along the circumference of the tread, and are in mirror symmetry about the equatorial plane. The friction block includes a plurality of fixing protrusions, which are gradually sharp along the direction away from the tread. A surface of the tread is provided with a protection groove, and the fixing protrusions are positioned in the protection groove.

The pattern block includes a first pattern block, a second pattern block and a third pattern block, which are all in fixed connection with the tread, in which the first, second and third pattern blocks are gradually away from the equatorial plane of the tread in the direction against a running direction.

The pattern block also includes a fourth pattern block, a fifth pattern block and a sixth pattern block, in which the fourth pattern block is positioned on the side of the first pattern block against the running direction, and the fifth and sixth pattern blocks are successively distributed in the direction away from the fourth pattern block in the direction against the running direction.

With the above technical solution, by providing the pattern blocks and the friction blocks, the gap between the pattern blocks is relatively large, which improves the ability of the pattern block to be embedded into the snowy road, and reduces the contact area between the tread surface and the ground, so that more snow on the snowy road can be pressed into the gap between the pattern blocks to increase the friction between the tread and the ground. In addition, the snow, which is pressed between the pattern blocks, is abutted to the friction block, and the friction block is composed of a plurality of fixing protrusions with a huge surface roughness to further increase the friction between the snowy road and the tread, so that the tread can have a relatively large grip force.

By providing the protection groove, the fixing protrusions are not directly exposed to the surface of the tread. When the tread is running on the normal road and stones are stuck between the pattern blocks, the adjacent fixing blocks are limited to each other, and the fixing protrusion at the edge of the friction block is limited by the protection groove, so that the fixing protrusion is not easy to swing and fall off from the tread surface when subjected to the friction force of the stone, which improve the stability of the fixing protrusions on the tread surface. By providing the first, second and third pattern blocks in mirror symmetry about the equatorial plane, the gap between the pattern blocks, i.e., the pattern on the tread surface is directional. When the tread is running, the pattern on the tread surface makes the tread difficult to slip laterally, which is conducive to maintaining the stability of the tread when running in a straight line.

The fourth, fifth and sixth pattern block further ensure the stability of the tread when running in a straight line.

In some embodiments, at least two friction blocks are provided between each of the first and second pattern blocks and each of the fourth and fifth pattern blocks. In the direction against the running direction of the tread, the friction blocks are distributed in the direction gradually away from the equatorial plane of the tread, and the friction blocks are also provided behind the fourth and fifth pattern blocks in the direction against the running direction of the tread.

With the above technical solution, the friction blocks can be evenly distributed in the gaps among the first, second, third, fourth, fifth and sixth pattern blocks, so as to further increase the friction between the tread and the ground and further strengthen the grip of the tread.

In some embodiments, a first reinforcing block is fixedly connected to a side surface of the second pattern block facing the fourth pattern block. The first reinforcing block is in fixed connection with the tread and a surface of the first reinforcing block away from the tread is lower than a surface of the second pattern block away from the tread.

With the above technical solution, by providing the first reinforcing block, the strength of the second pattern block is improved, so that the second pattern block is not easy to crack and the durability is improved. In addition, the height of the first reinforcing block is lower than that of the second pattern block, so that the edges of the first reinforcing block and the second pattern block generate friction with the roadside when the tread is running, which improves the edge effect and increases the grip of the tread.

In some embodiments, the third pattern block is provided with a second groove in a middle of a surface thereof away from the tread, in which the second groove is L-shaped.

With the above technical solution, when the tread is running, the second groove can cut the water film between the road surface and the tread, so that the water can enter into the second groove and the second groove can accommodate the water, so as to avoid the phenomenon of water skiing and improve the grip of the tread.

In some embodiments, a second reinforcing block is fixedly connected to a side surface of the fifth pattern block facing the second pattern block. The second reinforcing block is in fixed connection with the tread and a surface of the second reinforcing block away from the tread is lower than a surface of the fifth pattern block away from the tread.

With the above technical solution, by providing the second reinforcing block, the strength of the fifth pattern block is improved, so that the fifth pattern block is not easy to crack and the durability is improved. In addition, the height of the second reinforcing block is lower than that of the fifth pattern block, so that the edges of the second reinforcing block and the fifth pattern block generate friction with the roadside when the tread is running, which improves the edge effect and increases the grip of the tread. Further, the second reinforcing block is opposite to the first reinforcing block, so that the volume of the snow stuck between the gaps is gradually decreased in the direction closing to the axis of the tread, which is conductive to the separation of snow stuck in the tread pattern from the tread surface, and the tread can maintain a lasting and better grip.

In some embodiments, the second and/or fifth pattern block are/is fixedly connected with a snow nail in a middle of the surface thereof away from the tread, the second and/or fifth pattern block are/is fixedly connected with a plurality of friction protrusions on the surface thereof away from the tread, and the friction protrusions are evenly distributed around the snow nail.

With the above technical solution, by providing snow nail, the abilities of the tread to break ice surface, snow surface, water film and so forth are improved, so as to further increase the grip of the tread. The friction protrusions are evenly distributed around the snow nail, when the snow nail pierces the ice and snow surface, the friction protrusions can further pierce the ice and snow surface, which increases the ice breaking area and the ice breaking points, so as to improve the ice breaking effect.

In some embodiments, the sixth pattern is provided with a fifth groove parallel to the equatorial plane of the tread on the surface thereof away from the tread. The fifth groove penetrates through the sixth pattern block, and the sixth pattern block is provided with a water accommodation groove, which is positioned in the middle of the fifth groove.

With the above technical solution, when the tread is running, the fifth groove can cut the water film between the road surface and the tread, so that the water can enter into the fifth groove and the fifth groove can accommodate the water, so as to avoid the phenomenon of water skiing and improve the grip of the tread.

In some embodiments, the third pattern block and the sixth pattern block are also provided with the friction blocks on the side surface away from the equatorial plane of the tread.

With the above technical solution, when the tread is running, the third and sixth pattern blocks positioned at the shoulder are abutted against the ground, so that the friction block is abutted against the ground and increase the friction between the tread and the ground, increases the grip of the tread and increase the traction ability of tread when turning.

DETAILED DESCRIPTION

The Chinese patent with the publication No. CN203418935U discloses a snow tire including a tire body and a tread, in which the tread includes a crown, a shoulder and a sidewall. The crown is provided in the tread and is abutted against the ground, the shoulder contacts the crown and the sidewall, and the crown is provided with a plurality of longitudinal grooves arranged along the circumference of the tread and a plurality of transverse grooves arranged along the width of the tread to crossly form a multi row pattern block sequence. The multi row pattern block sequence includes at least one of the polygon pattern block sequence and the parallelogram pattern block sequence. Each pattern block of the multi row pattern is provided with a fine groove.

The above existing technical solution has the following deficiencies: by providing the longitudinal and transverse grooves, the circumferential surface of the tire is divided into four rows of pattern block sequence, and each pattern block of the pattern block sequence is provided with the fine groove. The pattern block divided by the longitudinal and transverse grooves is relatively large and the gap between the pattern blocks is relatively small, so that the pattern block is not easy to embed into the snowy road, and leads to a poor grip ability for the road with heavy snow.

The present application is further described in detail below in combination with the accompanying drawings.

Figure 1:
FIG. 1 is an overall structure diagram of the tread.
Figure 2:
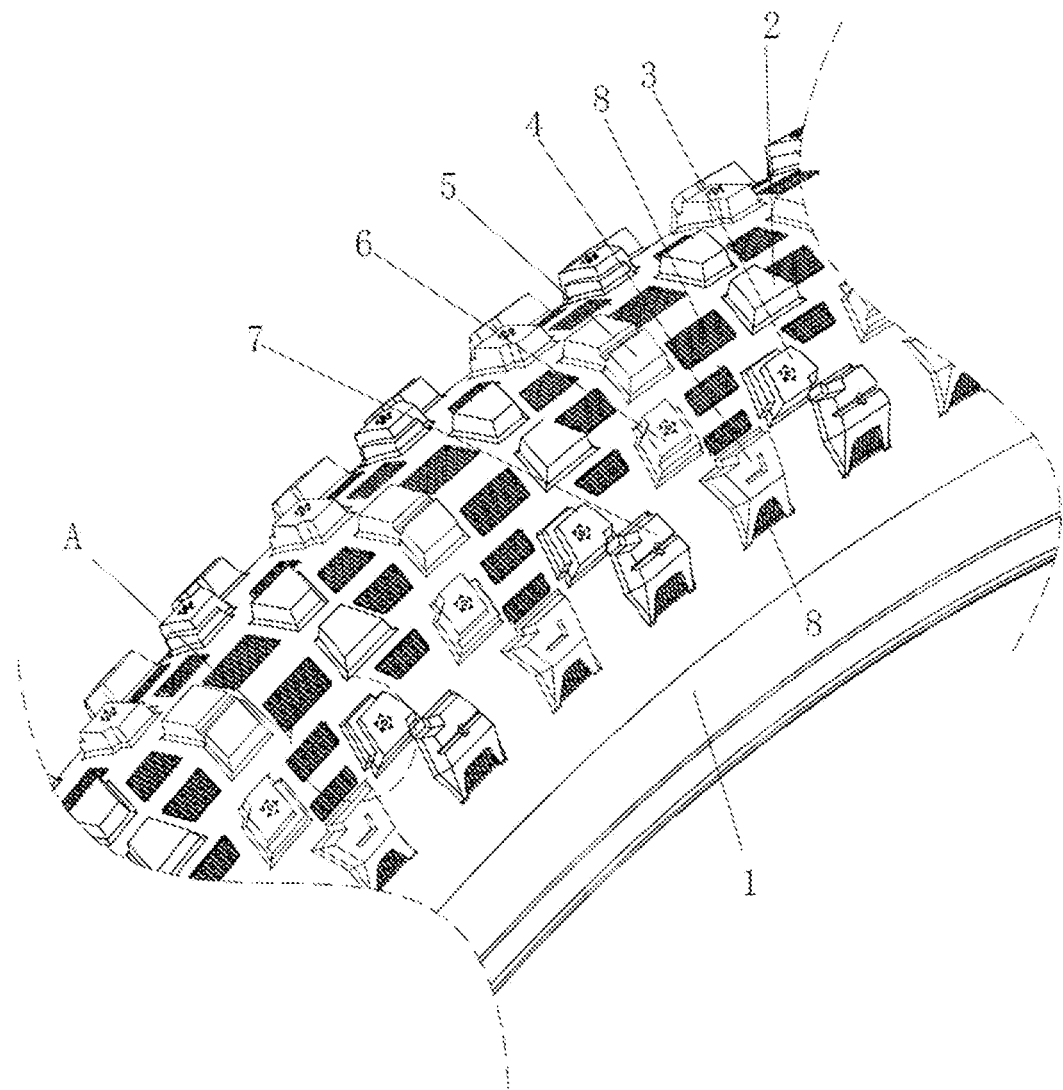
FIG. 2 is a partial structure diagram of the tread.
Figure 3:
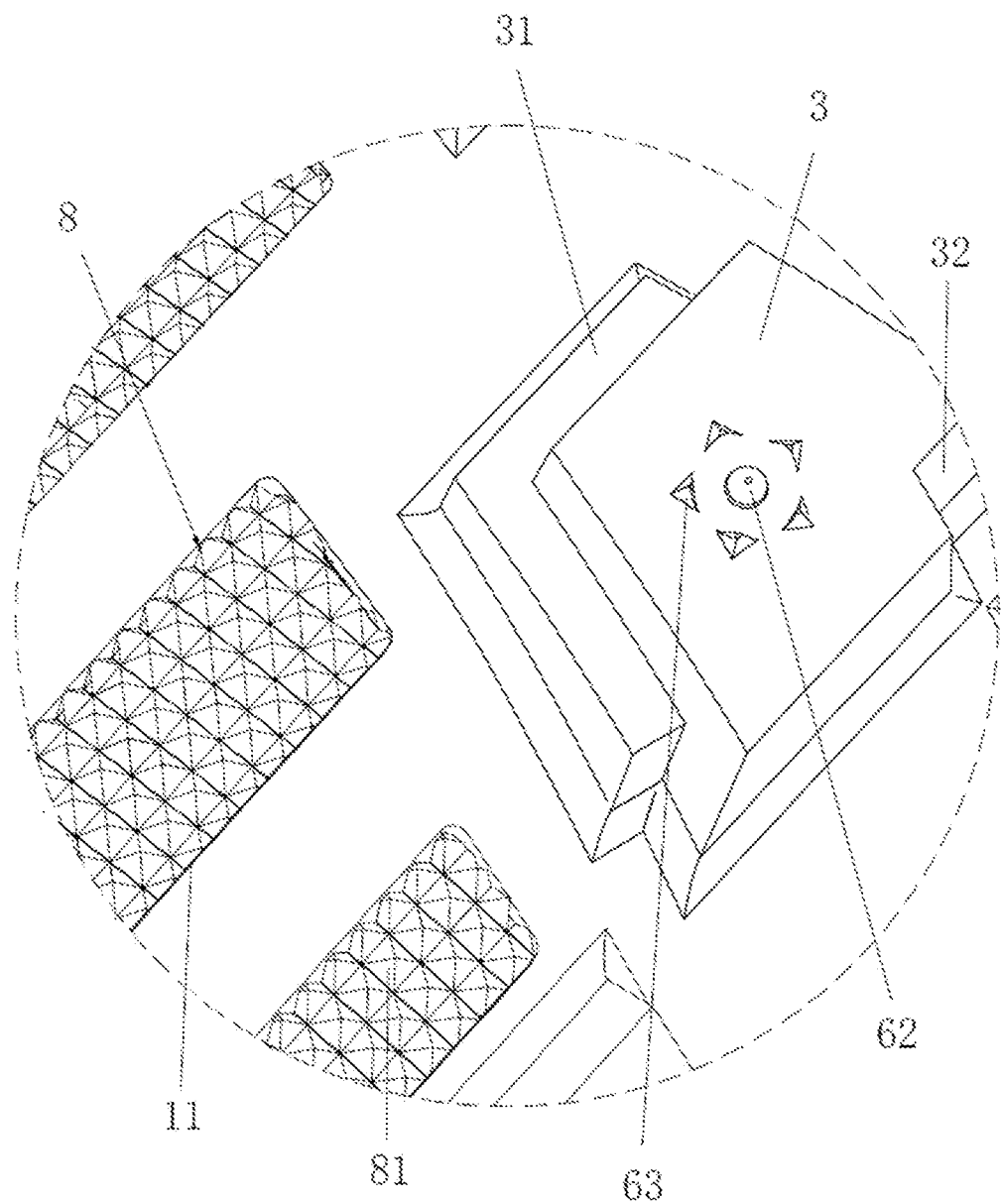
FIG. 3 is a partially enlarged schematic diagram of Part A in FIG. 2.

Referring to FIG. 1, FIG. 2 and FIG. 3, the present application provides a high grip snow tire including a tread 1. The tread 1 is provided with pattern blocks and friction blocks 8 positioned on the circumferential surface thereof on the same side with the equatorial plane in the tread 1. The pattern blocks and friction blocks 8 are successively distributed along the circumference of the tread 1, and are both in mirror symmetry about the equatorial plane of the tread 1. The friction block 8 includes a plurality of fixing protrusions 81, which are gradually sharp along the direction away from the tread 1, and the fixing protrusions 81 are closely arranged. The tread 1 is provided with a protection groove 11 on the surface thereof, and the fixing protrusions 81 are positioned in the protection groove 11. When the tread is running, more snow on the snowy road can be pressed into the gap between the pattern blocks to increase the friction between the tread 1 and the ground. In addition, the snow, which is pressed between the pattern blocks, is abutted to the friction block 8. Since the friction block has a huge surface roughness, the friction between the snowy road and the tread 1 is further increased, so as to increase the grip of the tread 1.

Figure 4:
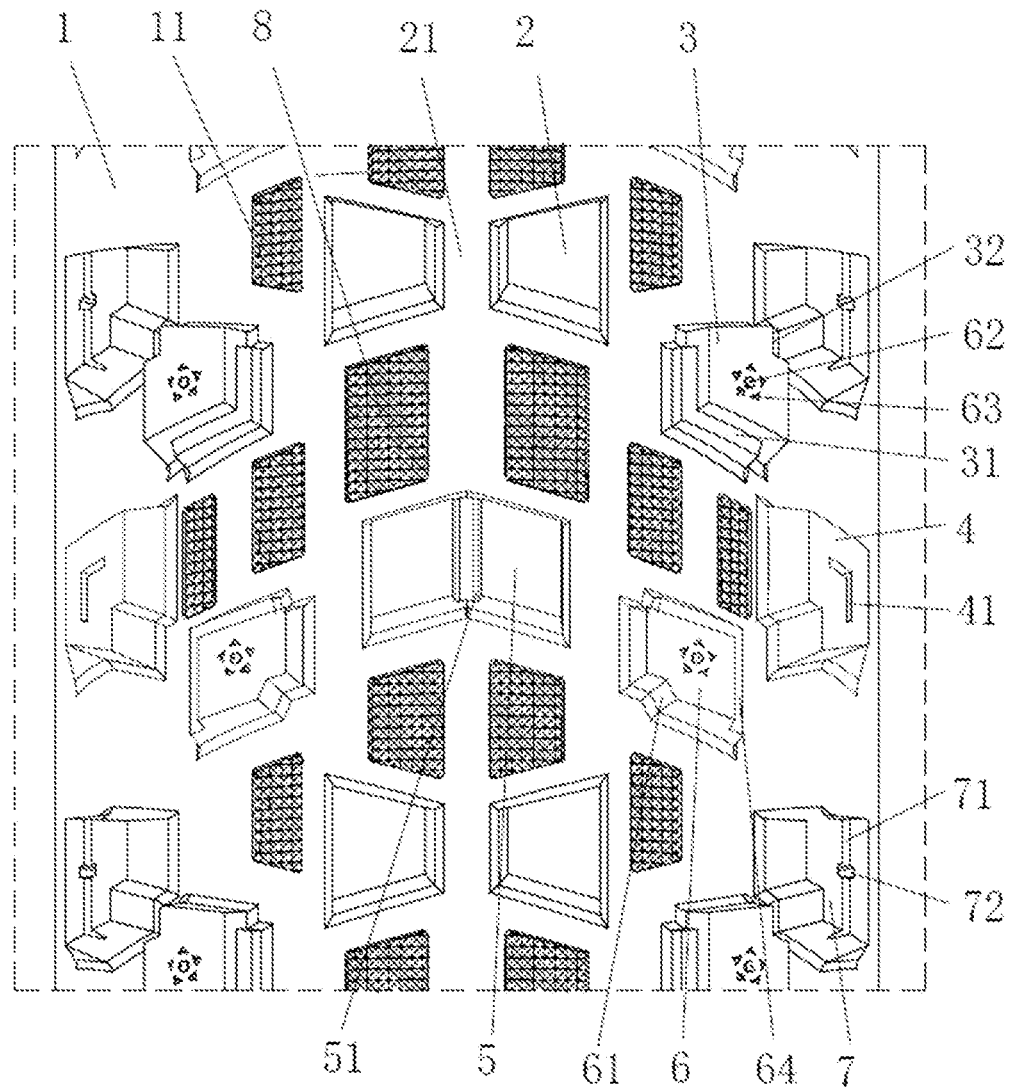
FIG. 4 is a front schematic diagram of the tread.

Referring to FIG. 3 and FIG. 4, the pattern block includes a first pattern block 2, a second pattern block 3, a third pattern block 4, a fourth pattern block 5, a fifth pattern block 6 and a sixth pattern block 7. The first pattern block 2, the third pattern block 4 and the fourth pattern block 5 are all in fixed connection with the tread 1. In the direction against the running direction, the first pattern block 2, the second pattern block 3 and the third pattern block 4 are gradually away from the equatorial plane of the tread 1. The fourth pattern block 5 is positioned on the side of the first pattern block 2 against the running direction of the tread 1. In the direction against the running direction, the fifth pattern block 6 and the sixth pattern block 7 are successively distributed in the direction away from the fourth pattern block 5. The third pattern block 4 and the sixth pattern block 7 are positioned at the shoulder of the tread 1, so that the gap between the pattern blocks, i.e., the pattern on the surface of the tread 1 is directional. When the tread 1 is running, the pattern on the surface of the tread 1 makes the tread 1 difficult to slip laterally, which is conducive to maintaining the stability of the tread 1 when running in a straight line.

Figure 5:
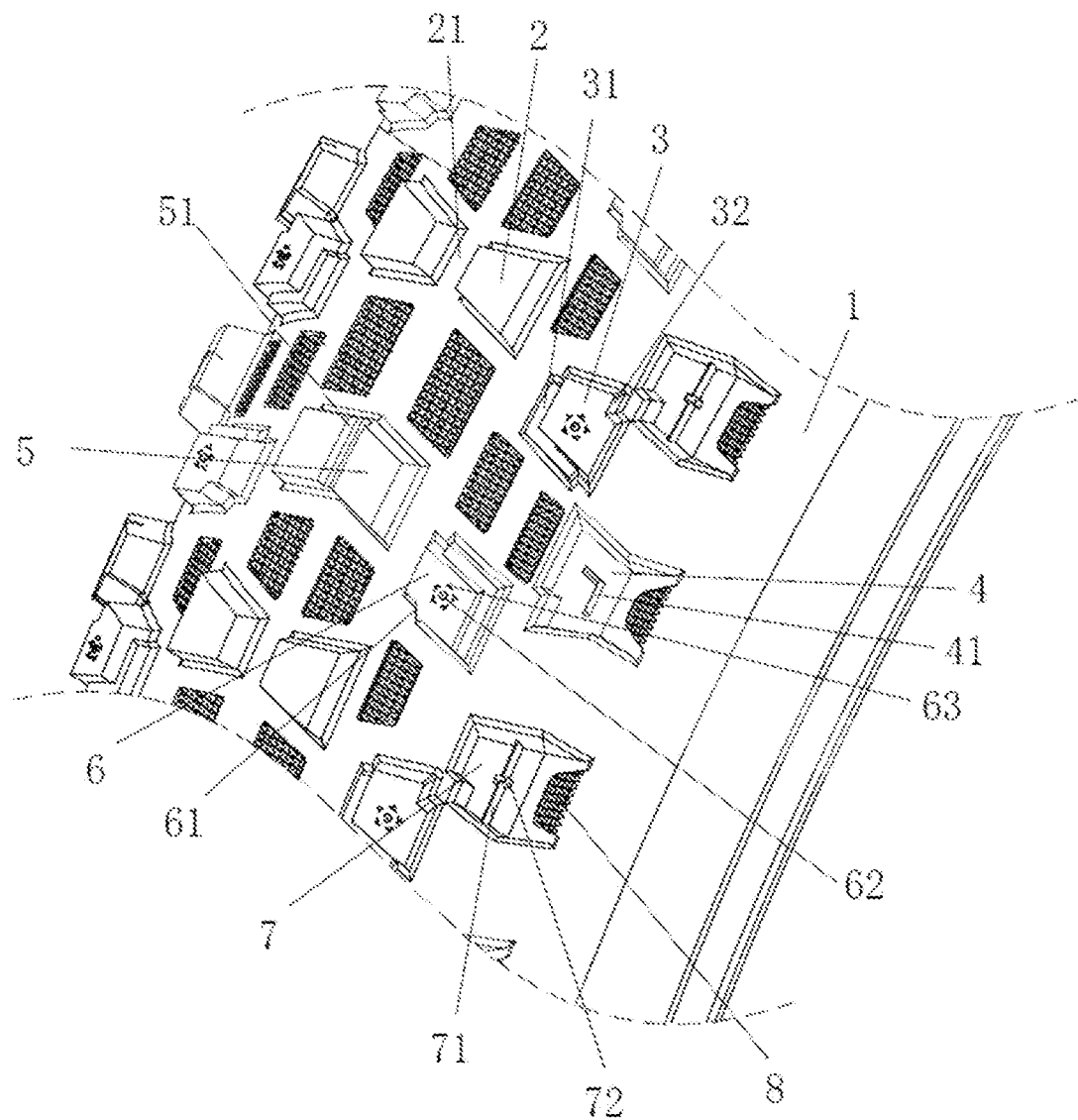
FIG. 5 is a schematic diagram embodying the side of the sixth pattern block away from the equatorial plane of the tread.

Referring to FIG. 4 and FIG. 5, at least two friction blocks 8 are provided in the gap between each of the first pattern block 2 and second pattern block 3 and each of the fourth pattern block 5 and fifth pattern block 6. In this embodiment, three friction blocks 8 are provided in the gap between each of the first pattern block 2 and second pattern block 3 and each of the fourth pattern block 5 and fifth pattern block 6. In the direction against the running direction of the tread 1, friction blocks 8 are also provided behind the fourth pattern block 5 and fifth pattern block 6. In this embodiment, two friction blocks 8 are provided behind the fourth pattern block 5 and fifth pattern block 6. In the direction against the running direction of the tread 1, the friction blocks 8 in the gap between each of the first pattern block 2 and second pattern block 3 and each of the fourth pattern block 5 and fifth pattern block 6 and the friction blocks 8 at the rear of the fourth pattern block 5 and fifth pattern block 6 are all distributed along the direction away from the equatorial plane of the tread 1. The friction blocks 8 can be evenly distributed between the bottom of the pattern blocks on the surface of the tread 1, so as to further increase the friction between the tread 1 and the ground and further strengthen the grip of the tread 1. The third pattern block 4 and sixth pattern block 7 are also provided with friction blocks 8 at the side surfaces thereof away from the equatorial plane of the tread 1. When the tire is running, the third pattern block 4 and sixth pattern block 7 positioned at the shoulder are abutted against the ground, so that the friction blocks 8 are abutted against the ground, which increases the friction between the tread 1 and the ground, and increases the grip of the tread 1.

Referring to FIG. 3 and FIG. 4, the first pattern block 2 has a certain gap from the equatorial plane of the tread 1, so that a middle groove 21 is formed between the two first pattern blocks 2 symmetrical about the equatorial plane. The fourth pattern block 5 is abutted to the equatorial plane of the tread 1, and the fourth pattern block 5 is provided with a third groove 51 parallel to the middle groove 21 on the side surface thereof, which is abutted to the equatorial plane of the tread 1, so that two third grooves 51 of two fourth pattern blocks 5 symmetrical about the equatorial plane are integrated and directly opposite to the middle groove 21. The third groove 51 and the middle groove 21 further improve the ability of the tread 1 to cut the water film and snow film, further improve the directionality of the pattern of the tread 1 and increase the grip of the tread 1.

Referring to FIG. 3 and FIG. 4, a first reinforcing block 31 is fixedly connected to a side surface of the second pattern block 3 facing the fourth pattern block 5. The first reinforcing block 31 is in fixed connection with the tread 1 and the surface of the first reinforcing block 31 away from the tread 1 is lower than the surface of the second pattern block 3 away from the tread 1. The second pattern block 3 is provided with a first groove 32 on the side surface thereof away from the fourth pattern block 5. A second reinforcing block 64 is fixedly connected to a side surface of the fifth pattern block 6 facing the second pattern block 3. The second reinforcing block 64 is in fixed connection with the tread 1 and the surface of the second reinforcing block 64 away from the tread 1 is lower than the surface of the fifth pattern block 6 away from the tread 1. The fifth pattern block 6 is provided with a fourth groove 61 on the side surface thereof away from the second pattern block 3. The first reinforcing block 31 reinforces the second pattern block 3, and the second reinforcing block 64 reinforces the fifth pattern block 6, so that the strength of the second pattern block 3 and the fifth pattern block 6 is improved and the durability is better. The second reinforcing block 64 is opposite to the first reinforcing block 31, so that the volume of snow stuck between the gaps is gradually reduced in the direction closing to the axis of the tread 1, which is conducive to the separation of snow stuck between the pattern blocks of the tread 1 from the surface of the tread 1.

Referring to FIG. 3 and FIG. 4, the third pattern block 4 is provided with a second groove 41 in the middle of the surface thereof away from the tread 1, in which the second groove 41 is L-shaped, extends along the running direction of the tread 1 and then extends along the direction closing to the equatorial plane of the tread 1. The second pattern block 3 and fifth pattern block 6 are fixedly connected with a snow nails 62 in the middle of the surface thereof away from the tread 1, the second pattern block 3 and fifth pattern block 6 are fixedly connected with a plurality of friction protrusions 63 on the surface thereof away from the tread 1, and the friction protrusions 63 are evenly distributed around the snow nail 62, so that the snow nail 62 pierces the ice and snow surface and the friction protrusions 63 further pierce the ice and snow surface, which increases the ice breaking area, and the ice and snow surface is pierced more evenly.

The sixth pattern block 7 is provided with a fifth groove 71 parallel to the equatorial plane of the tread 1 in the middle of the surface thereof away from the tread 1. The fifth groove 71 circumferentially penetrates through the sixth pattern block 7, and the fifth groove 71 forms a flared shape along the direction away from the tread 1, so that water is easier to enter into the fifth groove 71. The sixth pattern block 7 is provided with a water accommodation groove 72. The water accommodation groove 72 is positioned in the middle of the fifth groove 71 and crosses the fifth groove 71. The groove length of the water accommodation groove 72 is larger than the maximum groove width of the fifth groove 71, so that the water accommodation groove 72 can accommodate more water.

The implementation principle of the present application is: when the tire is running, the distribution of the first pattern block 2, second pattern block 3, third pattern block 4, fourth pattern block 5, fifth pattern block 6 and sixth pattern block 7 makes the pattern on the surface of tread 1 have a better directionality, which improves the stability of the tread 1 when running in a straight line. The snow nail 62 and the friction protrusions 63 can pierce ice surface, snow surface, water film and so forth. In addition, the middle groove 21, the third groove 51, the second groove 41 and the fifth groove 71 cut off the water film and otherwise, then the water can enter into the second groove 41, fifth groove 71 and the water accommodation groove 72 to enhance the grip of the tire. Further, more snow on the snowy road can be pressed into the gaps among the first pattern blocks 2, second pattern blocks 3, third pattern blocks 4, fourth pattern blocks 5, fifth pattern blocks 6 and sixth pattern blocks 7 to increase the friction between the tread 1 and the ground. And the snow pressed between the pattern blocks are abutted to the friction blocks 8, which further increase the friction between the snowy road and the tread 1, so that the tread 1 can have a larger grip.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. A high grip snow tire, comprising: a tread, wherein pattern blocks and friction blocks are provided on a circumferential surface of the tread and positioned on a same side with an equatorial plane of the tread; the pattern blocks and the friction blocks are successively distributed along a circumference of the tread, and the pattern blocks and the friction blocks are in mirror symmetry about the equatorial plane; each of the friction blocks comprises a plurality of fixing protrusions, which are gradually sharp along a direction away from the tread; a surface of the tread is provided with a protection groove, and the plurality of fixing protrusions are positioned in the protection groove;

each of the pattern blocks comprises a first pattern block, a second pattern block and a third pattern block, which are all in fixed connection with the tread, wherein the first pattern block, the second pattern block and the third pattern block are gradually away from the equatorial plane of the tread in a direction against a running direction;

each of the pattern blocks also comprises a fourth pattern block, a fifth pattern block and a sixth pattern block, wherein the fourth pattern block is positioned on a side of the first pattern block against the running direction, and the fifth pattern block and the sixth pattern block are successively distributed away from the fourth pattern block in the direction against the running direction, wherein a fifth groove parallel to the equatorial plane of the tread is formed on a surface of the sixth pattern block away from the tread, the fifth groove penetrates through the sixth pattern block, and the sixth pattern block is provided with a water accommodation groove, which is positioned in a middle of the fifth groove and crosses the fifth groove.

2. The high grip snow tire according to claim 1, wherein at least two of the friction blocks are provided between each of the first pattern block and the second pattern block and each of the fourth pattern block and the fifth pattern block; in the direction against the running direction of the tread, the friction blocks are distributed in a direction gradually away from the equatorial plane of the tread, and the friction blocks are also provided behind the fourth pattern block and the fifth pattern block in the direction against the running direction of the tread.

3. The high grip snow tire according to claim 1, wherein a first reinforcing block is fixedly connected to a side surface of the second pattern block facing the fourth pattern block, the first reinforcing block is in fixed connection with the tread, and a surface of the first reinforcing block away from the tread is lower than a surface of the second pattern block away from the tread.

4. The high grip snow tire according to claim 1, wherein a second groove is formed in a middle of a surface of the third pattern block away from the tread, and the second groove is L-shaped.

5. The high grip snow tire according to claim 1, wherein a second reinforcing block is fixedly connected to a side surface of the fifth pattern block facing the second pattern block, the second reinforcing block is in fixed connection with the tread, and a surface of the second reinforcing block away from the tread is lower than a surface of the fifth pattern block away from the tread.

6. The high grip snow tire according to claim 1, wherein a snow nail is fixedly connected in a middle of a surface of at least one of the second pattern block or the fifth pattern block away from the tread, a plurality of friction protrusions are fixedly connected to the surface of the at least one of the second pattern block or the fifth pattern block away from the tread, and the plurality of friction protrusions are evenly distributed around the snow nail.

7. The high grip snow tire according to claim 1, wherein the third pattern block and the sixth pattern block are also provided with the friction blocks on a side surface away from the equatorial plane of the tread.

\* \* \* \* \*